US010565191B2

(12) United States Patent
Boyer

(10) Patent No.: US 10,565,191 B2
(45) Date of Patent: Feb. 18, 2020

(54) COGNITIVE PROGRAM SUITE FOR A COGNITIVE DEVICE AND A MOBILE DEVICE

(71) Applicant: INTERNATIONAL BUSINESS MACHINES CORPORATION, Armonk, NY (US)

(72) Inventor: Trent W. Boyer, Columbus, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 15/613,542

(22) Filed: Jun. 5, 2017

(65) Prior Publication Data

US 2018/0349376 A1  Dec. 6, 2018

(51) Int. Cl.
*G10L 15/00* (2013.01)
*G06F 16/2452* (2019.01)
*G06F 3/16* (2006.01)
*G06F 16/432* (2019.01)

(52) U.S. Cl.
CPC ........ *G06F 16/24522* (2019.01); *G06F 3/167* (2013.01); *G06F 16/433* (2019.01)

(58) Field of Classification Search
CPC ....... G10L 15/22; G10L 15/265; G06F 3/167; H04M 2201/40
USPC ................................ 704/231–257, 270–275
See application file for complete search history.

(56) References Cited

U.S. PATENT DOCUMENTS

| 8,386,250 | B2 * | 2/2013 | Lloyd | H04M 1/271 |
| | | | | 704/244 |
| 8,682,667 | B2 * | 3/2014 | Haughay | G10L 15/22 |
| | | | | 704/246 |
| 9,100,493 | B1 | 8/2015 | Zhou et al. | |
| 9,535,902 | B1 * | 1/2017 | Michalak | G06F 16/38 |
| 10,304,463 | B2 * | 5/2019 | Mixter | G10L 15/08 |
| 2003/0065738 | A1 * | 4/2003 | Yang | G06F 8/65 |
| | | | | 709/215 |
| 2008/0062969 | A1 * | 3/2008 | Picard | H04L 51/18 |
| | | | | 370/352 |
| 2012/0231821 | A1 * | 9/2012 | Swanson | H04W 4/046 |
| | | | | 455/466 |
| 2014/0223311 | A1 * | 8/2014 | Auer | G06Q 10/10 |
| | | | | 715/730 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Jesse S Pullias
(74) *Attorney, Agent, or Firm* — Brian Restauro; Andrew Wright; Roberts Mlotkowski Safran Cole & Calderon, P.C.

(57) ABSTRACT

Systems and methods for utilizing a cognitive device are disclosed. A method includes: receiving, by a computer device, a query from a cognitive device; processing, by the computer device, the query to generate a processed query; transmitting, by the computer device, the processed query to a mobile device; receiving, by the computer device, an action query result from the mobile device based on the mobile device receiving the processed query and performing an action query; transmitting, by the computer device, the action query result to the cognitive device based on receiving the action query result.

20 Claims, 10 Drawing Sheets

(56) References Cited

U.S. PATENT DOCUMENTS

| | | |
|---|---|---|
| 2015/0045007 A1 | 2/2015 | Cash et al. |
| 2015/0338917 A1 | 11/2015 | Steiner et al. |
| 2016/0183069 A1* | 6/2016 | Wilson .................... H04W 4/14 455/466 |
| 2018/0096690 A1* | 4/2018 | Mixter .................... G10L 15/08 |
| 2018/0301147 A1* | 10/2018 | Kim ........................ G10L 15/22 |

OTHER PUBLICATIONS

List of IBM Patents or Patent Applications Treated as Related, dated Dec. 17, 2019, 1 page.
Specification "Cognitive Program Suite for a Cognitive Device and a Mobile Device" and Drawings in U.S. Appl. No. 16/693,941, filed Nov. 25, 2019, 54 pages.

* cited by examiner

COGNITIVE PROGRAM SUITE FOR A COGNITIVE DEVICE AND A MOBILE DEVICE

BACKGROUND

The present invention relates generally to a cognitive program suite and, more particularly, to a system and method for utilizing a cognitive device to perform actions on a mobile device via the cognitive program suite.

A cognitive device (also called a smart speaker) is a hardware device that facilitates user interaction with a virtual assistant (also called a smart assistant or an intelligent personal assistant). Such devices continuously listen for a wake word to be spoken by a user and perform various tasks based on voice commands from the user. For example, such devices are capable of voice controlled music playback, making to-do lists, setting alarms, streaming podcasts, playing audiobooks, and providing weather, traffic and other real time information. Such devices can also control smart devices as a home automation hub. Increasingly, cognitive devices are being used by users to perform actions on mobile devices.

SUMMARY

In an aspect of the invention, a computer implemented method includes receiving, by a computer device, a query from a cognitive device; processing, by the computer device, the query to generate a processed query; transmitting, by the computer device, the processed query to a mobile device; receiving, by the computer device, an action query result from the mobile device based on the mobile device receiving the processed query and performing an action query; transmitting, by the computer device, the action query result to the cognitive device based on receiving the action query result.

In another aspect of the invention, a computer program product comprises a computer readable storage medium having program instructions embodied therewith, the program instructions executable by a computer device to cause the computer device to: receive a read Short Messaging Service (SMS) message query from a cognitive device; process the read Short Messaging Service (SMS) message query to generate a read SMS message processed query; transmit the read SMS message processed query to a mobile device; receive an SMS message query result from the mobile device based on the mobile device receiving the read SMS message processed query and performing a read SMS message query; transmit the SMS message query result to the cognitive device based on receiving the SMS message query result In another aspect of the invention, there is a system for utilizing a cognitive device. The system includes a CPU, a computer readable memory and a computer readable storage medium associated with a computing device; program instructions to receive a send email query from a cognitive device; program instructions to process the send email query to generate a send email processed query; program instructions to transmit the send email processed query to a mobile device, program instructions to receive a send email query result from the mobile device based on the mobile device receiving the send email processed query and performing a send email query, program instructions to transmit the send email query result to the cognitive device based on receiving the send email query result. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
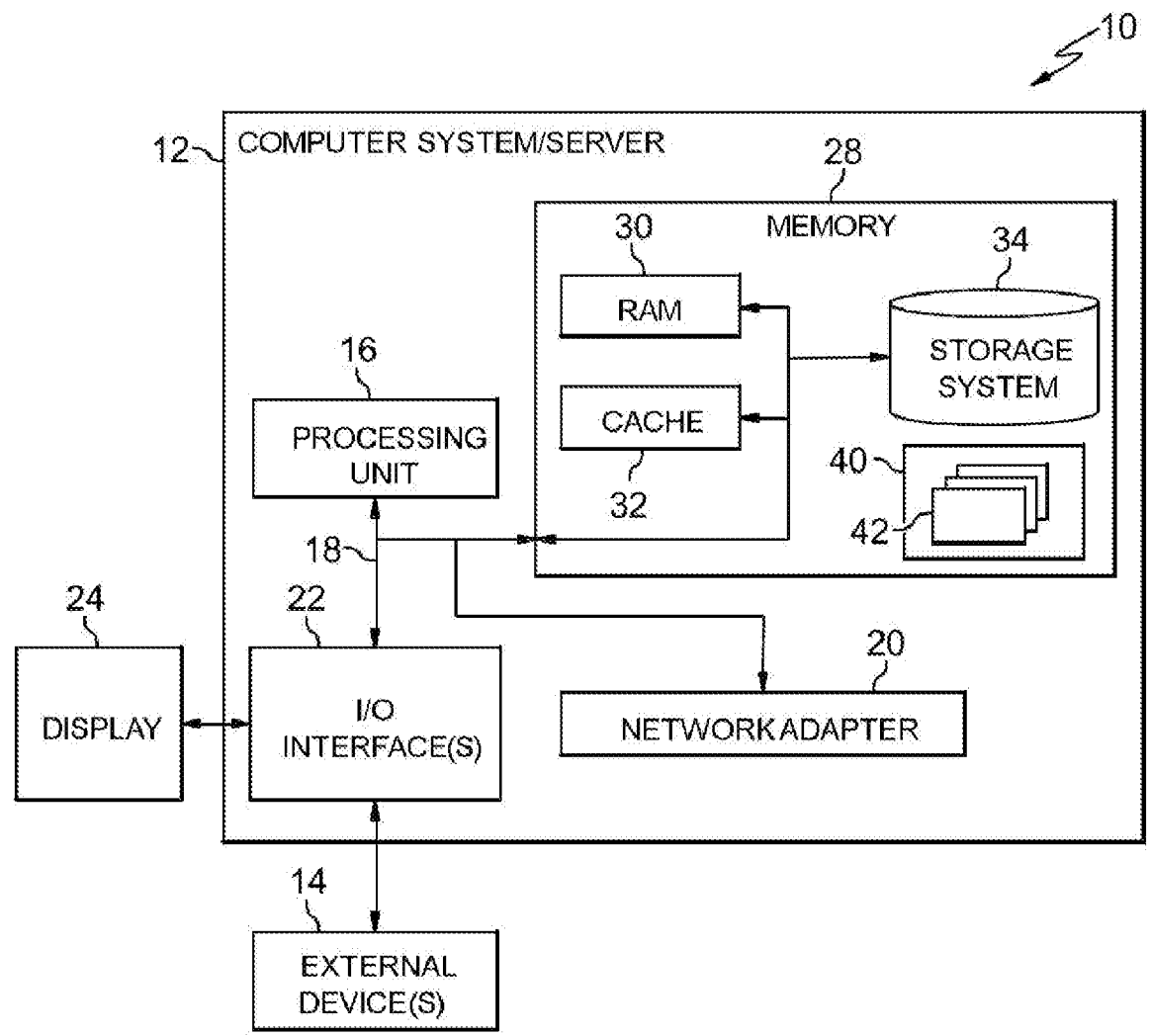
FIG. 1 depicts a computing infrastructure according to an aspect of the present invention.

The present invention relates generally to a cognitive program suite and, more particularly, to a system and method for utilizing a cognitive device to perform actions on a mobile device via the cognitive program suite. Partnering the cognitive device with the mobile device is a complex process involving developing a cognitive program suite that can process a specific request from a user on the cognitive device, reside in a cloud based service, and process the specific request at the mobile device. Currently, no direct solution exists for interfacing the cognitive device with the mobile device for specific types of user requests.

Aspects of the present invention provide a system for controlling a mobile device via a cognitive device by receiving a natural language request from a user at the cognitive device, querying the mobile device to process the natural language request over a cloud based computing environment, and acknowledging that the natural language request has been completed by the mobile device. In aspects, should the mobile phone need additional information to process the natural language request, the mobile device requests the additional information from the user via the cognitive device before completing the natural language request.

In aspects, the user controls an action by the mobile device by communicating with the cognitive device. In aspects, the cognitive device receives and processes the natural language request from the user and formats the natural language request into a query (e.g., a JavaScript Object Notation (JSON) query). In aspects, the cognitive device transmits the query to a cognitive device program residing in the cloud based computing environment. In aspects, the cognitive device program processes the query and transmits a processed query to the mobile device. In this manner, a user may interact with the cognitive device via voice commands to control functions of their mobile device, the functions including but not limited to: sending and receiving text (SMS) messages; sending and receiving email; making a telephone call; listening to voicemail; and using map-based navigation.

In aspects, the mobile device performs the action based on the processed query or requests additional information from the cognitive device. In aspects, the mobile device transmits an action result to the cognitive device and the cognitive device informs the user that the natural language request was completed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
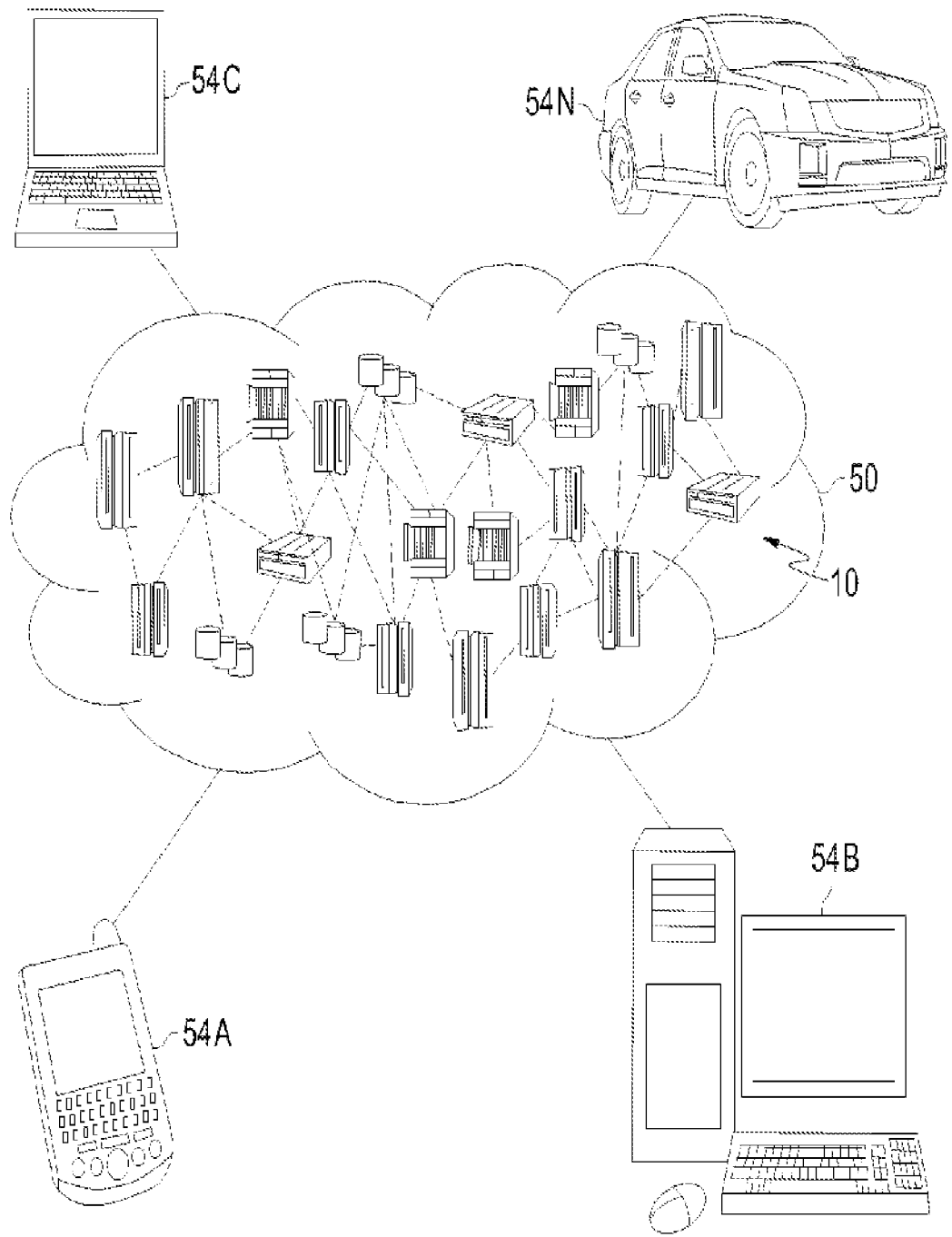
FIG. 2 depicts a cloud computing environment according to an aspect of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
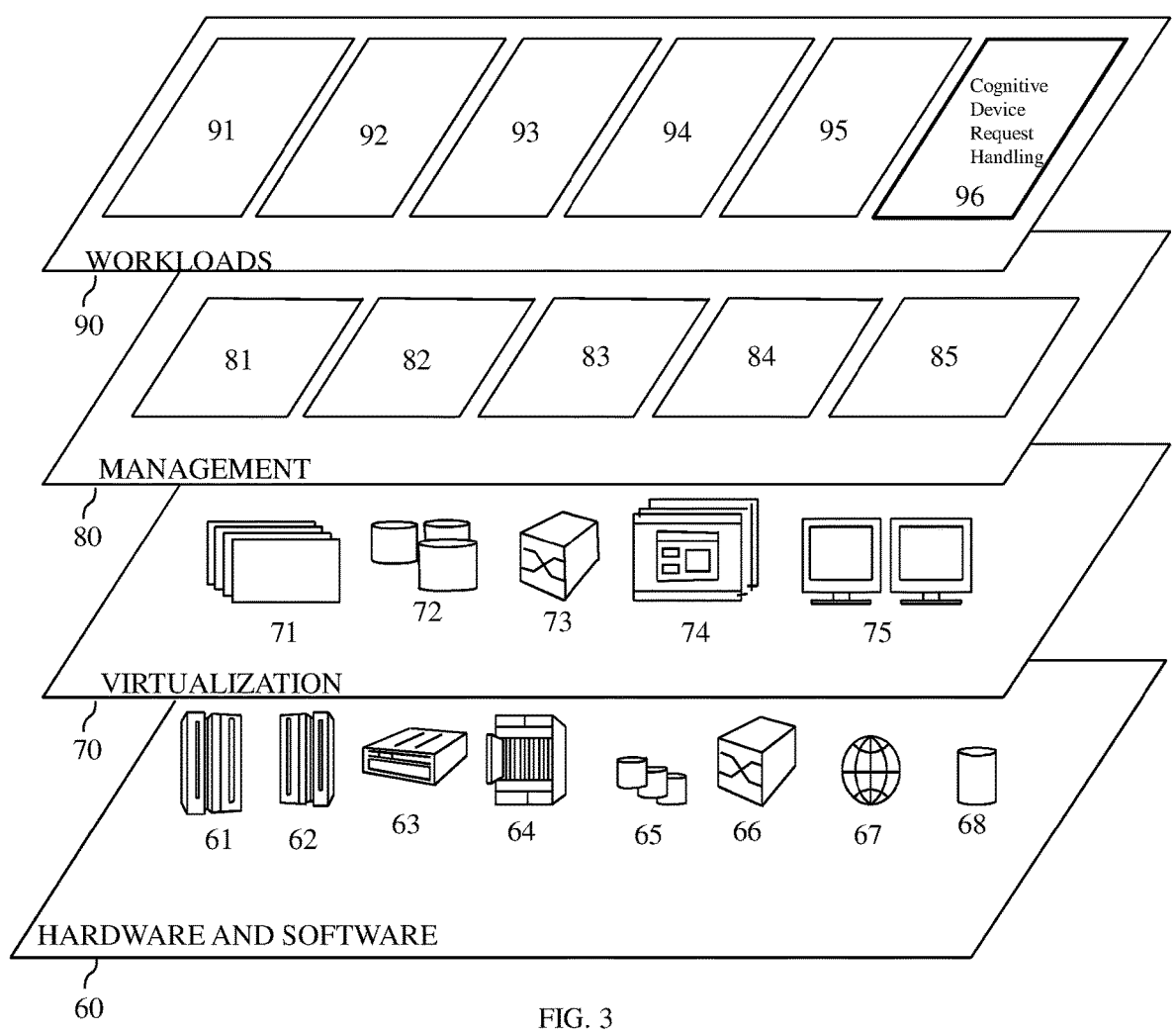
FIG. 3 depicts abstraction model layers according to an aspect of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive device request handling 96.

Referring back to FIG. 1, the program/utility 40 may include one or more program modules 42 that generally carry out the functions and/or methodologies of embodiments of the invention as described herein (e.g., such as the functionality provided by the cognitive device request handling 96). Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
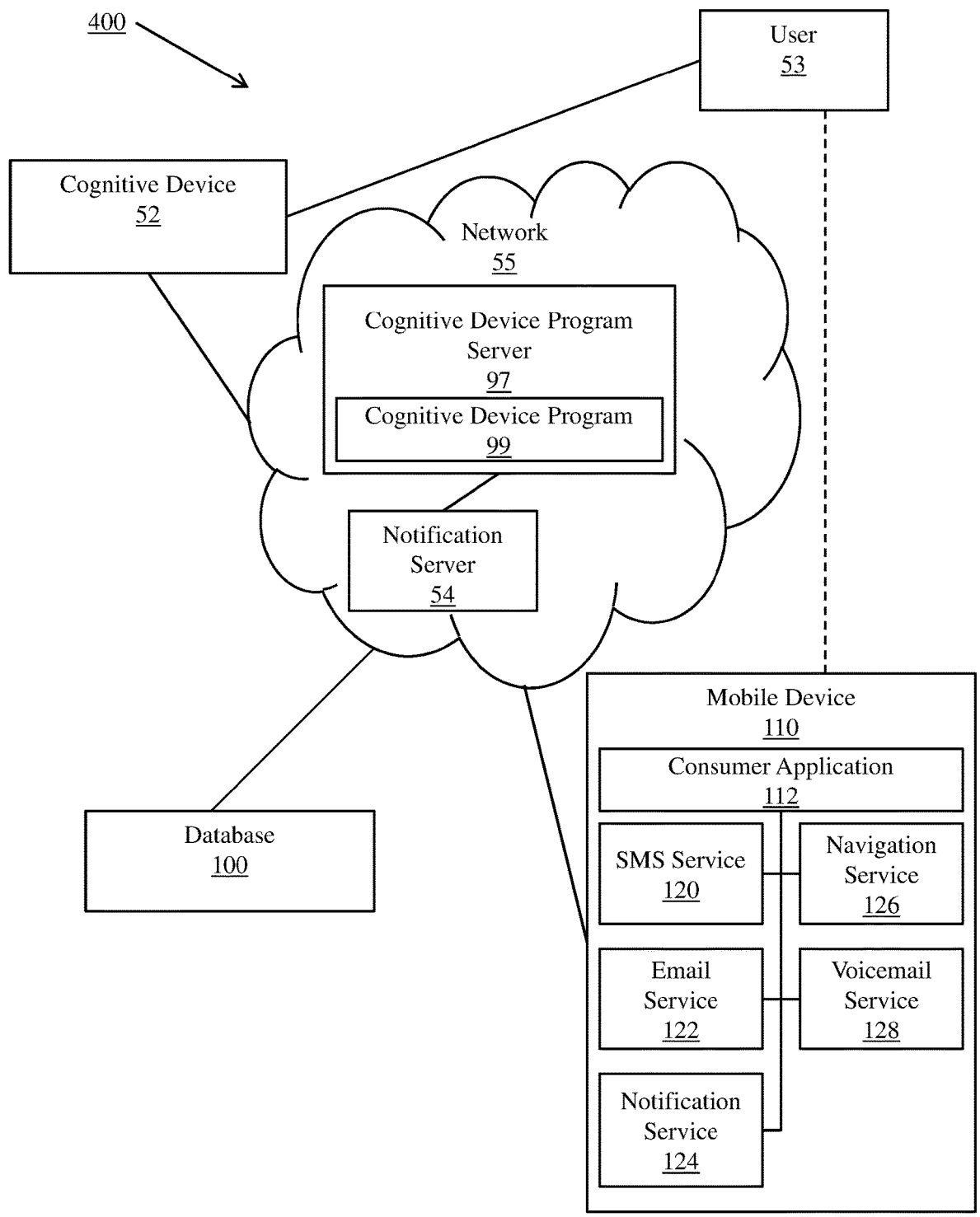
FIG. 4 shows an exemplary environment in accordance with aspects of the invention.

FIG. 4 shows an exemplary environment in accordance with aspects of the invention. Increasingly, cognitive devices are being used by consumers to perform actions on mobile devices. However, conventional solutions create fractured communication mechanisms that are not centralized into a single communication mechanism to the mobile device via the cognitive device by the user, and limit the number of uses of the mobile device by the user via the cognitive device.

In aspects of the invention, a cognitive device partners with a mobile device (e.g., by synching to a consumer application designed to partner with the cognitive device) to send and receive text (e.g., Short Messaging Service (SMS) message and email over a default SMS message service or email service on the mobile device), read active notifications (e.g., notifications over a notification service), activate navigation commands (e.g., navigation commands over a navigation service such as the Global Positioning (GPS) service), and play voicemail (e.g., stream a voicemail to the user over the cognitive device over a voicemail service). In aspects described herein, the present invention provides an interface between the mobile device and the cognitive device (e.g., by providing a user application on the mobile device) to perform multiple actions requested by the user on the mobile device (e.g., by using the cognitive device program residing in cloud computing system).

Referring to FIG. 4, environment 400 includes a cognitive device 52, a user 53, a network 55, a cognitive device program server 97 with a cognitive device program 99 residing in the cloud computing environment connected to the network 55, a notification server 54 residing in the cloud computing environment connected to the network 55, a database 100, a mobile device 110, and a consumer application 112 residing in the mobile device 110. The consumer application 112 residing in the mobile device 110 is configured to receive communications from the cognitive device program server 97 and access a SMS message service 120, an email service 122, a notification service 124, a navigation service 126, and a voicemail service 128 based on requests received by the cognitive device program server 97 from the user 53.

In embodiments, one or more components in the environment 400 may correspond to one or more components in the cloud computing environment of FIG. 2. In aspects, one or more components in the environment 400 may include the components of computer system/server 12 of FIG. 1. In aspects, the network 55 may be any suitable communication network or combination of networks, such as a local area network (LAN), a general wide area network (WAN), a public network (e.g., the Internet), a 3G network, a Long-Term Evolution (LTE) network, and/or a 5G network Conventionally, the user 53 interacts directly with the mobile device 110 to perform actions such as sending a text or activating a navigation command. Aspects of the present invention allow the user 53 to perform actions on the mobile device 110 by interacting with the cognitive device 52 instead of interacting directly with the mobile device 110. In embodiments, the cognitive device 52 is a computer device that includes elements of the computer system 12 of FIG. 1. In a particular embodiment, the cognitive device includes at least: a memory, a processor, a microphone, a speaker, and a network adapter. In embodiments, the cognitive device program server 97 is a computer device that includes elements of the computer system 12 of FIG. 1, and the cognitive device program 99 comprises one or more program modules (e.g., program modules 44 of FIG. 1) that are configured to perform processes described herein.

In aspects, the cognitive device 52 receives the natural language request from the user 53 (e.g., by a microphone on the cognitive device 52) and formats the natural language request into a query (e.g., a JSON query). In aspects, based on formatting the natural language request into the query, the cognitive device 52 transmits the query to the cognitive device program server 97 over the network 55.

Based on receiving the query, the cognitive device program 99 on the cognitive device program server 97 processes the query. The processing may include determining an action in the query to be performed by the consumer application 112 of the mobile device 110 and transmitting a processed query (e.g., a read SMS message processed query or a read email processed query, a send SMS message processed query or a send email processed query, a notification processed query, a navigation command processed query, and a voicemail processed query) in a format executable by the consumer application 112 to the consumer application 112 (e.g., via the notification server 54 which ties the cognitive device program server 97 with the consumer application 112). The notification server 54 enables developers to send notification data or information from a developer-run server (e.g., the cognitive device program server 97) to applications (e.g., the cognitive device program 99) on the developer-run server and then to an application on a remote device (e.g., the consumer application 112 on the mobile device 110).

Based on receiving the processed query from the notification server 54, the consumer application 112 performs an action query (e.g., a read text query, send text query, a notification query, a navigation command query, and a voicemail query). In aspects, based on performing the action query, the consumer application 112 transmits a query result (e.g., a read text query result, send text query result, a notification query result, a navigation command query result, and a voicemail query result) to the cognitive device 52 via the cognitive device program server 97. In aspects, based on receiving the query result from the cognitive device program server 97, the cognitive device 52 informs the user 53 of the query result in natural language (e.g., speaks to the user 53 from a speaker on the cognitive device 52).

Prior to the consumer application 112 performing the action query, the consumer application 112 determines whether the user 53 may access to the mobile device 110 and the type of access (e.g., access level) to the mobile device 110. The consumer application 112 specifies in the settings of the mobile device 110 that the user 53 may access the mobile device 110 and the type of access to the mobile device 110 for the user 53. In this manner, the consumer application 112 determines that the user 53 is the only user allowed access the mobile device 110 in the case where there are multiple users utilizing the cognitive device 52 (e.g., multiple users in a multi-user household).

For example, if the user 53 is listed in the settings of the mobile device 110, the consumer application 112 determines the access and the access level for the user 53 for the mobile device 110 and performs the action query on the mobile device 110. In another example, if the user 53 is not listed in the settings of the mobile device 110, the consumer application 112 restricts access (e.g., deactivating the mobile device 110) to the mobile device 110 for the user 53. In yet another example, the consumer application 112 may also restrict access to the mobile device 110 if the navigation service 126 (e.g., a GPS service) informs the consumer application 112 that the mobile device 110 is no longer within a predefined area around the cognitive device 52.

In another aspect, prior to the to the consumer application 112 performing the action query, the consumer application 112 determines the access and the access level for the user 53 using location based authentication (e.g., via the GPS service on the mobile device 110). Location based authentication is a procedure to prove an individual's identity and authenticity on appearance by detecting the presence of the individual a distinct location. For example, if the user 53 is within a predefined area around the cognitive device 52, the consumer application 112 determines the user 53 is within the predefined area around the cognitive device 52 and allows access to the mobile device 110 for the user 53. The access and the level of access is determined by the consumer application 112 and specified in the settings of the mobile device 110.

In accordance with other aspects, prior to the to the consumer application 112 performing the action query, the consumer application 112 may request additional information from the user 53 should the consumer application 112 be unable to perform the action query (e.g., confirmation to send or read a SMS message, send or read an email, activate a navigation command on the mobile device 110, retrieve a phone notification from the mobile device 110, and play a voicemail on the mobile device 110). In aspects, if the consumer application 112 is unable to perform the action, the consumer application 112 transmits a request for additional information to the cognitive device program server 97.

In aspects, based on receiving the request for additional information, the cognitive device program server 97 may perform one or more of: retrieving the additional information from the database 100, retrieving the additional information from the user 53 via the cognitive device 52, or exiting a connection with the consumer application 112 after transmitting an exit command (e.g., where the consumer application 112 is unable to perform the action on the mobile device 110) to the cognitive device 52.

Figure 5:
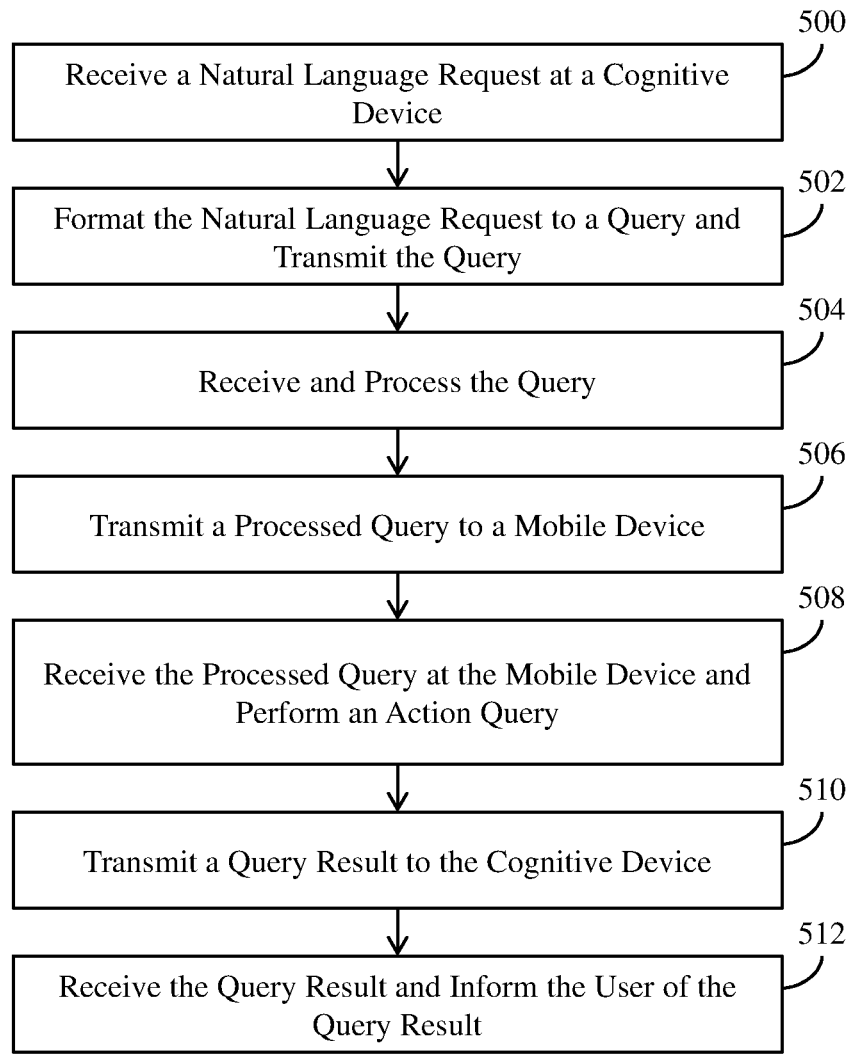
FIG. 5 illustrates a flowchart of steps of a method in accordance with aspects of the invention.

FIG. 5 shows a flowchart of steps of a method in accordance with aspects of the invention. The steps of the method may be implemented in the environment of FIG. 4 and are described with reference to the elements and functions described in FIG. 4. The flowchart of FIG. 5 illustrates the architecture, functionality, and operation of possible implementations of systems, methods, and computer program products according to various embodiments of the present invention.

At step 500, the cognitive device 52 receives a natural language request (e.g., a natural language command) from the user 53. For example, as described with respect to FIG. 4, a user may speak a request and the cognitive device 52 may detect the spoken request (e.g., when the spoken request contains a wake word) using one or more microphones.

At step 502, based on receiving the natural language request at step 500, the cognitive device 52 formats the natural language request to a query and transmits the query to the cognitive device program server 97 via the network 55. The query may be a JSON query but is not limited to a JSON query.

At step 504, the cognitive device program 99 in the cognitive device program server 97 receives and processes the query from step 502. For example, the processing may include one or more of determining an action in the query (e.g., send or read a SMS message, send or read a email, activate a navigation command, retrieve a notification, and play a voicemail), forwarding the query to the notification server 54, changing the query into a format executable by the consumer application 112, confirming the action on the query (e.g., with the user 53).

At step 506, the cognitive device program server 97 transmits a processed query (e.g., send or read a SMS message processed query, send or read a email processed query, a navigation command processed query, retrieve a notification processed query, and a voicemail processed query) from step 504 to the consumer application 112 on the mobile device 110. The cognitive device program server 97 transmits the processed query via the notification server 54 which ties the cognitive device program server 97 to the consumer application 112 on the mobile device 110.

At step 508, the consumer application 112 receives the processed query from step 510, determines whether the user 53 may access (e.g., level of access) the mobile device 110, and performs an action query on a service (e.g., by accessing the SMS message service 120, the email service 122, the notification service 124, the navigation service 126, and the voicemail service 128) on the mobile device 110. For example, the action query may include a read text query (e.g., accessing data from the SMS message service 120 or the email service 122), a send text query (e.g., accessing data from the SMS message service 120 or the email service 122), a notification query (e.g., accessing data from the notification service 124), a navigation command query (e.g., accessing data from the navigation service 126), and a voicemail query (e.g., accessing data from the voicemail service 138.

At step 510, the consumer application 112 performs the action query from step 508 and transmits a query result to the cognitive device 52 via the cognitive device program server 97. For example, the query result may include a read text query result, a send text query result, a notification query result, a navigation command query result, and a voicemail query result.

At step 512, the cognitive device 52 receives the query result from step 520 and informs the user 53 of the query result. For example, as described with respect to FIG. 4, the cognitive device 52 speaks the query result over a speaker to the user 53 in natural language.

Figure 6:
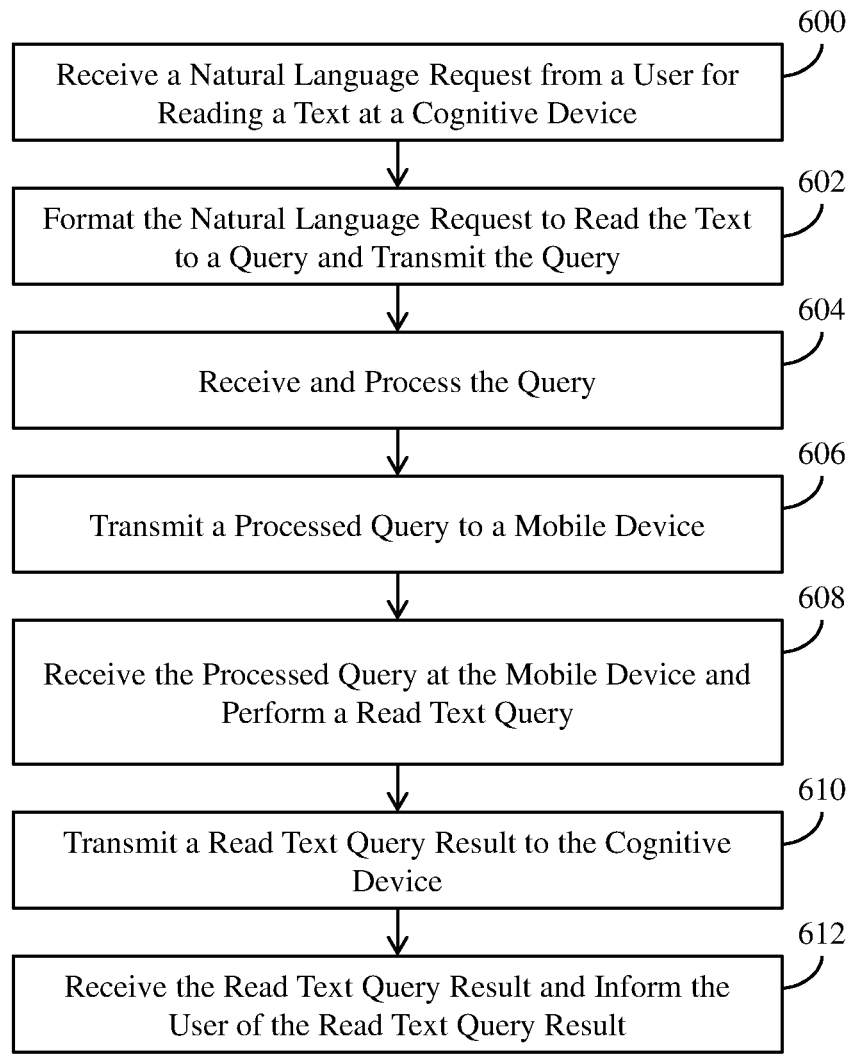
FIG. 6 illustrates a flowchart of steps of a method in accordance with aspects of the invention.

FIG. 6 shows a flowchart of steps of a method in accordance with aspects of the invention. The steps of the method describe a request by the user 53 for having the cognitive device 52 read text (e.g., SMS message or an email) from the mobile device 110 to the user 53. The steps of the method may be implemented in the environment of FIG. 4 and are described with reference to the elements and functions described in FIG. 4. The flowchart of FIG. 6 illustrates the architecture, functionality, and operation of possible implementations of systems, methods, and computer program products according to various embodiments of the present invention.

At step 600, the cognitive device 52 receives a natural language request (e.g., a natural language command) from the user 53 for a reading of a text (e.g., the SMS message or the email) on the mobile device 110. For example, the user 53 may request that the cognitive device 52 read an SMS message on the mobile device 110 from a colleague.

At step 602, based on receiving the natural language request for the reading of the text at step 600, the cognitive device 52 formats the natural language request for the reading of the text to a query (e.g., a JSON query) and transmits the query to the cognitive device program server 97 via the network 55. For example, based on receiving the request for reading the SMS message, the cognitive device program server 97 formats the request to a query and transmits the query to the cognitive device program server 97.

At step 604, the cognitive device program 99 in the cognitive device program server 97 receives and processes the query from step 602. The processing of the query by the cognitive device program 99 includes: determining an action in the query (e.g., read the SMS message or email from the mobile device 110) and formatting the query to a format executable by the consumer application 112. For example, based on receiving the query which includes the request to read the SMS message, the cognitive device program 99 determines that the action in the query is to read the SMS message and formats the query to a format executable by the consumer application 112.

At step 606, the cognitive device program server 97 transmits a read processed query (e.g., a read SMS message processed query or a read email processed query) from step 604 to the consumer application 112 on the mobile device 110 via the notification server 54. For example, based on receiving and processing the query to read the SMS message, the cognitive device program server 97 transmits the read SMS message processed query, which includes reading the SMS message, to the consumer application 112 via the notification server 54.

At step 608, the consumer application 112 receives the processed query from step 606, determines whether the user 53 may access (e.g., level of access) the mobile device 110, and performs a read text query on a database of the mobile device 110. For example, based on receiving the read processed query to read the SMS message, the consumer application 112 performs a read SMS message query on the SMS message service 120 within the mobile device 110 (e.g., by accessing the SMS message from the colleague in the SMS message service 120). In another example, for a read email query, the consumer application 112 performs the read email query on the email service 122 (e.g., the default email service or another email service) within the mobile device 110 (e.g., by accessing the email from the colleague in the email service 122).

At step 610, based on the consumer application 112 performing the read text query on the mobile device 110 at step 608, the consumer application 112 transmits a read text query result to the cognitive device 52 via the cognitive device program server 97. For example, based on performing read SMS message query, the consumer application 112 transmits a read SMS message query result to the cognitive device 52 via the cognitive device program server 97.

Prior to the consumer application 112 performing the read text query at step 610, the consumer application 112 may transmit an additional information request to the user 53 for additional information via the cognitive device program server 97 (e.g., if the consumer application 112 is unable to perform the read text query or there are multiple contacts for the SMS message). For example, if the consumer application 112 is unable to perform the SMS message query (e.g., when there are multiple SMS message from the colleague in the database or multiple contacts for the read SMS message query), the consumer application 112 transmits an additional information (e.g., a request for a date of the SMS message from the colleague or a request for a particular contact in the SMS message) request for additional information to the cognitive device program server 97.

In aspects, based on receiving the additional information request from the consumer application 112, the cognitive device program server 97: retrieves the additional information from the database 100 or retrieves the additional information from the user 53 via the cognitive device 52 (e.g., the cognitive device 52 queries the user 53 for the additional information and repeats steps 600 to 608 with the additional information). For example, based on receiving the additional information request of the date of the SMS message, the cognitive device program server 97 retrieves the date of the SMS message by querying the user 53 via the cognitive device 52 for the date of the SMS message.

In aspects, based on the cognitive device program server 97 being unable to retrieve the additional information from the database 100 or the user 53, the cognitive device program server 97 exits a connection with the consumer application 112 and the cognitive device 52 and transmits an exit command to the consumer application 112 and the cognitive device 52. For example, based on the cognitive device program server 97 being unable to retrieve the data of the SMS message from the user 53, the cognitive device program server 97 transmits the exit command to the consumer application 112 and the cognitive device 52.

In aspects, based on the cognitive device program server 97 transmitting the exit command, the cognitive device 52 receives the exit command and informs the user 53 of an inability to perform the natural language request. For example, based on receiving the exit command from the cognitive device program server 97 (e.g., where the cognitive device program server 97 is unable to retrieve the date of the SMS message), the cognitive device 52 informs the user that the request for the SMS message from the colleague cannot be performed.

At step 612, the cognitive device 52 receives the read text query result from step 610 and informs the user 53 of the read text query result in natural language. For example, based on receiving the read SMS message query result, the cognitive device 52 reads the SMS message to the user 53 in natural language over a speaker on the cognitive device 52.

Figure 7:
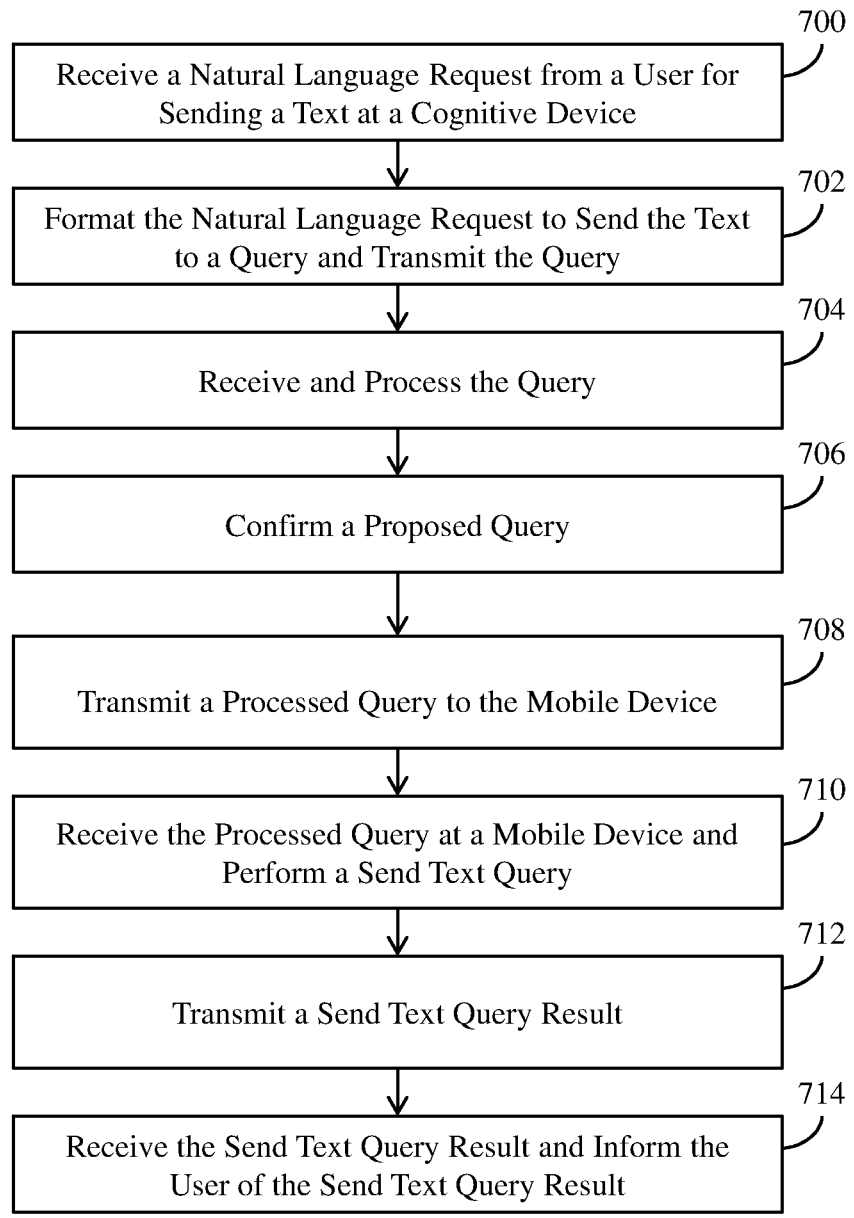
FIG. 7 illustrates a flowchart of steps of a method in accordance with aspects of the invention.

FIG. 7 shows a flowchart of steps of a method in accordance with aspects of the invention. The steps of the method describe a request by the user 53 for having the cognitive device 52 send an SMS message or an email message from the mobile device 110. The steps of the method may be implemented in the environment of FIG. 1 and are described with reference to the elements and functions described in FIG. 1. The flowchart of FIG. 7 illustrates the architecture, functionality, and operation of possible implementations of systems, methods, and computer program products according to various embodiments of the present invention.

At step 700, the cognitive device 52 receives a natural language request (e.g., a natural language command) from the user 53 for sending a text (e.g., an SMS message or an email) from the mobile device 110. For example, the user 53 may request that the cognitive device 52 send an email to a contact from the mobile device 110.

At step 702, based on receiving the natural language request for sending the text at step 700, the cognitive device 52 formats the natural language request for sending the text as a query (e.g., a JSON query) and transmits the query to the cognitive device program server 97 via the network 55. For example, based on the cognitive device 52 receiving the request to send the email, the cognitive device program server 97 formats the request as a query and transmits the query to the cognitive device program server 97.

At step 704, the cognitive device program 99 in the cognitive device program server 97 receives and processes the query from step 702. The processing of the query by the cognitive device program 99 includes: determining an action in the query, determining whether the query includes contact information and a message body, storing the query in a session state as a proposed query (e.g., a proposed JSON query), and formatting the proposed query to a format executable by the consumer application 112.

For example, based on receiving the query, the cognitive device program 99 determines that the action in the query is to send an email, determines that the query includes an email contact and an email body, stores the query as a proposed query in a session state and formats the proposed to a format executable by the consumer application 112.

At step 706, based on the cognitive device program 99 processing the query at step 704, the cognitive device program server 97 confirms the proposed query with the user 53 via the cognitive device 52. For example, the cognitive device program server 97 confirms a proposed query with the user 53 by having the cognitive device 52 speak the email contact and the email body to the user 53 for confirmation by the user 53. If the email is incorrect, the user 53 speaks a corrected email to the cognitive device 52 and steps 700-706 are repeated until the proposed query is confirmed by the user 53.

At step 708, based on the cognitive device program server 97 confirming the proposed query with the user 53 at step 706, the cognitive device program server 97 transmits a send text processed query (e.g., a send SMS message processed query or a send email processed query which includes the confirmed proposed query) to the consumer application 112 on the mobile device 110 via the notification server 54. For example, based on confirming the proposed query (e.g., which includes the confirmed email contact and the email body), the cognitive device program server 97 transmits the send processed query, which includes sending an email, to the consumer application 112 via the notification server 54.

At step 710, the consumer application 112 receives the send text processed query from step 708, determines whether the user 53 may access (e.g., level of access) the mobile device 110, and performs a send text query (e.g., creating the text and transmitting the text via the SMS message service 120 or the email service 122) from the mobile device 110. For example, based on receiving the processed query, the consumer application 112 creates the email via the email service 122 with the information on the processed query (e.g., the confirmed email contact and the email body) and sends the email via the email service 122 from the mobile device 110 to the contact.

Prior the consumer application 112 performing the send text query at step 710 and if the send text query could be sent to more than one contact, the consumer application 112 transmits an additional contact information query (e.g., with all the contacts that could answer the send text query) to the cognitive device 52 via the cognitive device program server 97. Based on receiving the additional contact information query, the cognitive device 52 requests additional contact information in the additional contact information query from the user 53 in natural language.

In aspects, if the user provides the additional contact information, steps 700-706 repeats with the additional information from the user 53. In aspects, if the user does not provide the additional contact information, the cognitive device 52 transmits an exit command to the cognitive device program server 97 and informs the user 53 of an exit In aspects, if the user provides the additional contact information, steps 700-706 repeats with the additional information from the user 53. In aspects, if the user does not provide the additional contact information, the cognitive device 52 transmits an exit command to the cognitive device program server 97 and informs the user 53 of an exit.

At step 712, based on the consumer application 112 performing the send text query at step 710, the consumer application 112 transmits a send text query result to the cognitive device 52 via the cognitive device program server 97. For example, based on sending the email, the consumer application 112 transmits a sent email query result to the cognitive device 52 via the cognitive device program server 97.

At step 714, the cognitive device 52 receives the read text query result from step 712 and informs the user 53 of the read text query result in natural language. For example, based on receiving the sent email result query, the cognitive device 52 informs the user 53 in natural langue over a speaker on the cognitive device 52 that the email has been sent.

Figure 8:
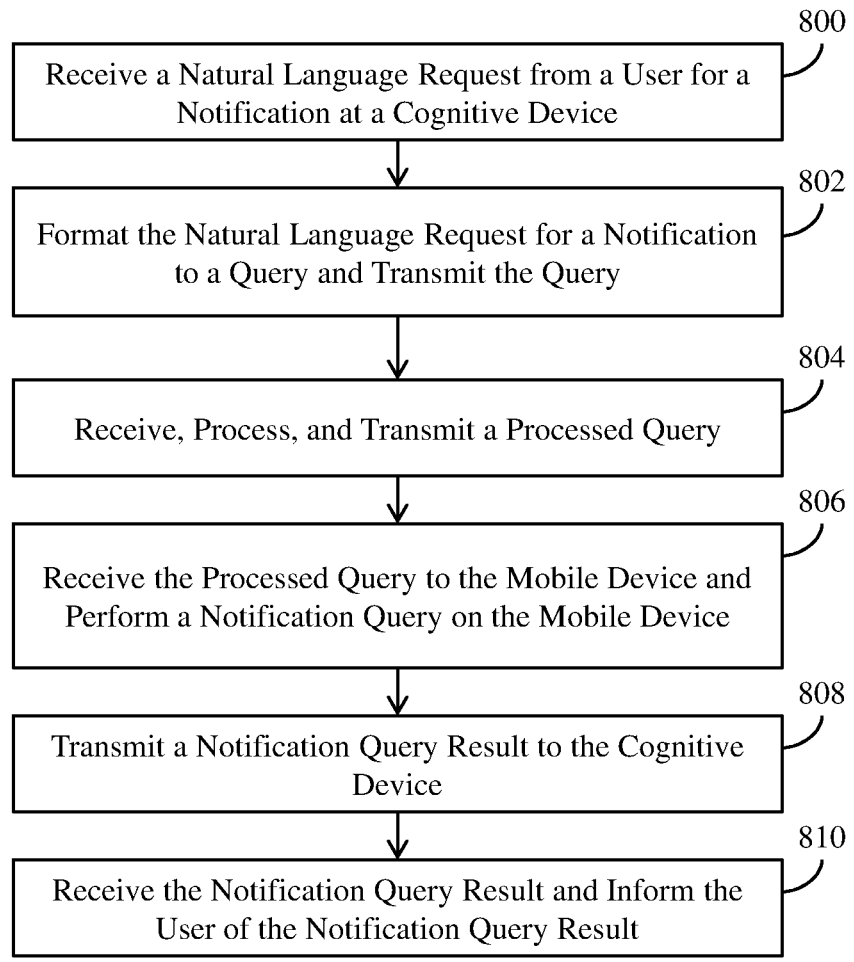
FIG. 8 illustrates a flowchart of steps of a method in accordance with aspects of the invention.

FIG. 8 shows a flowchart of steps of a method in accordance with aspects of the invention. The steps of the method describe a request by the user 53 for having the cognitive device 52 retrieve and read a notification (e.g., a SMS message notification from a news wire notification) from the mobile device 110 to the user 53. The steps of the method may be implemented in the environment of FIG. 4 and are described with reference to the elements and functions described in FIG. 4. The flowchart of FIG. 8 illustrates the architecture, functionality, and operation of possible implementations of systems, methods, and computer program products according to various embodiments of the present invention.

At step 800, the cognitive device 52 receives a natural language request (e.g., a natural language command) from the user 53 to retrieve a notification from the mobile device 110. For example, the notification may be but is not limited to a notification from a news wire notification or a website notification.

At step 802, based on receiving the natural language request to retrieve the notification at step 800, the cognitive device 52 formats the natural language request to retrieve the notification as a query (e.g., a JSON query) and transmits the query to the cognitive device program server 97 via the network 55. For example, based on receiving a request to retrieve a notification, the cognitive device 52 formats the request to a query and transmits the query to the cognitive device program server 97.

At step 804, the cognitive device program 99 in the cognitive device program server 97 receives and processes the query from step 802. The processing of the query includes: determining an action in the query (e.g., retrieve the notification from the mobile device 110) and formatting the query to a format executable by the consumer application 112. In aspects, the cognitive device program server 97 additionally transmits a notification processed query (e.g., a notification processed query) to the consumer application 112 via the notification server 54 for querying the mobile device 110 for outstanding notifications.

At step 806, the consumer application 112 receives the notification processed query from step 804, determines whether the user 53 may access (e.g., level of access) the mobile device 110, and performs a notification query on a database of the mobile device 110. In aspects, the consumer application 112 utilizes the notification service 124 (e.g., a notification listener service that monitors and records notifications) to access outstanding notifications on the mobile device 110. The notification query runs on in the background of the mobile device 110 so no other applications on the mobile device 110 are aware of the notification action query.

At step 808, based on the consumer application 112 performing the notification query on the mobile device 110 at step 806, the consumer application 112 transmits a notification query result to the cognitive device 52 via the cognitive device program server 97. For example, based on the retrieving the notification from the mobile device 110, the consumer application 112 transmits a notification query result, which includes the notification, to the cognitive device 52 via the cognitive device program server 97.

At step 810, the cognitive device 52 receives the notification query result from step 808 and informs the user 53 of the notification query result in natural language. For example, based on receiving the notification query result, the cognitive device 52 reads the notification to the user 53 in natural language over a speaker on the cognitive device 52.

Figure 9:
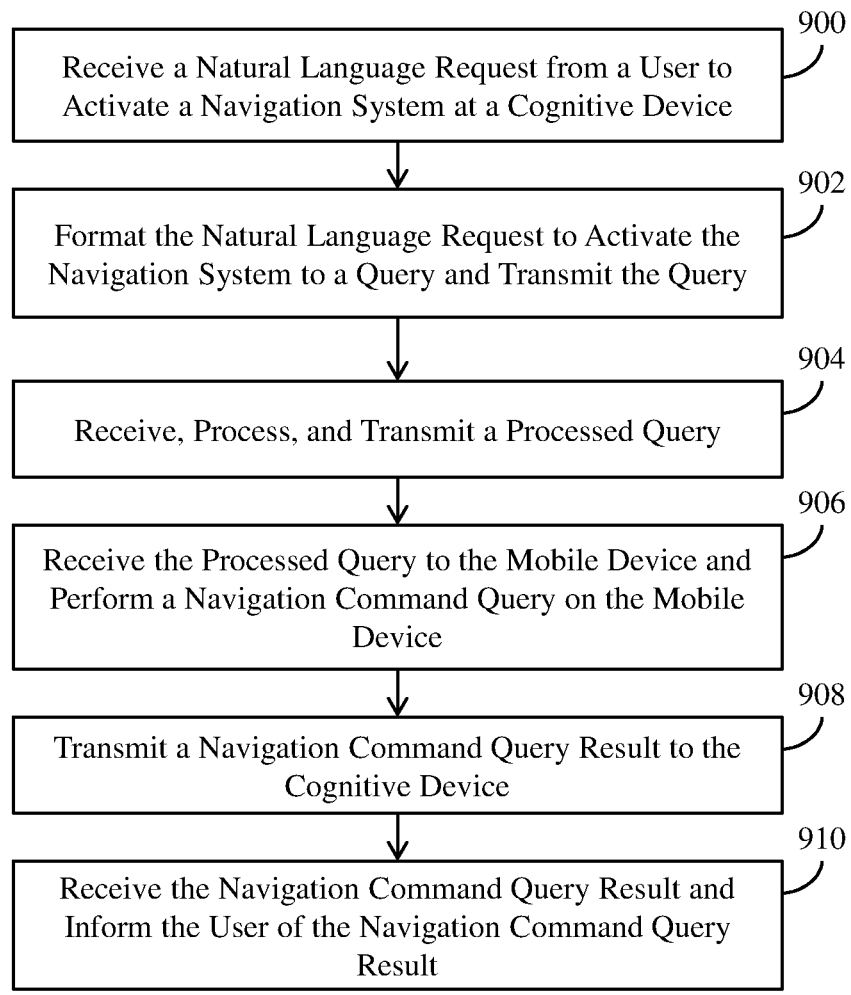
FIG. 9 illustrates a flowchart of steps of a method in accordance with aspects of the invention.

FIG. 9 shows a flowchart of steps of a method in accordance with aspects of the invention. The steps of the method describe a request by the user 53 for having the cognitive device 52 active a navigation system (e.g., a GPS navigation system) on the mobile device 110 to the user 53. The steps of the method may be implemented in the environment of FIG. 4 and are described with reference to the elements and functions described in FIG. 4. The flowchart of FIG. 9 illustrates the architecture, functionality, and operation of possible implementations of systems, methods, and computer program products according to various embodiments of the present invention.

At step 900, the cognitive device 52 receives a natural language request (e.g., a natural language command) from the user 53 to activate a navigation system on the mobile device 110. For example, the cognitive device 52 receives a natural language request to active a GPS system to find the address of a grocery store or a medical center.

At step 902, based on receiving the natural language request to activate the navigation system at step 900, the cognitive device 52 formats the natural language request to activate the navigation system as a query (e.g., a JSON query) and transmits the query to the cognitive device program server 97 via the network 55. For example, based on receiving a request to active the GPS system to find the address of the grocery store, the cognitive device 52 formats the request to a query and transmits the query to the cognitive device program server 97.

At step 904, the cognitive device program 99 in the cognitive device program server 97 receives and processes the query from step 902. In aspects, the processing of the query includes: determining an action in the query, confirming the query includes the correct information (e.g., confirming the name of the grocery store or medical center with the user 53 via the cognitive device 52). In aspects, the cognitive device program server 97 additionally transmits a navigation processed query (e.g., a navigation command processed query) to the consumer application 112 via the notification server 54 for querying the mobile device 110 to active the GPS system to find the address of the grocery store.

At step 906, the consumer application 112 receives the navigation command processed query from step 904, determines whether the user 53 may access (e.g., level of access) the mobile device 110, and performs a navigation command query (e.g., accessing the navigation service 126 for a turn by turn navigation query or a location query) on the mobile device 110 such as determining the address or location of the grocery store. If the navigation command query is of an address, the cognitive device program server 97 transmits a turn by turn navigation query to the preferred GPS on the mobile device 110. If the navigation command query is a location query, the cognitive device program server 97 transmits a location query to the preferred GPS on the mobile device 110.

At step 908, based on the consumer application 112 performing the navigation command query on the mobile device 110 at step 906, the consumer application 112 transmits a navigation command query result to the cognitive device 52 via the cognitive device program server 97. For example, based on performing the location query (e.g., the location of the grocery store), the consumer application 112 transmits the navigation command query result, which includes the location of the grocery store, to the cognitive device 52 via the cognitive device program server 97.

At step 910, the cognitive device 52 receives the navigation command query result from step 908 and informs the user 53 of the navigation command query result in natural language. For example, based on receiving the navigation command query result, the cognitive device 52 reads the location of the grocery store to the user 53 in natural language over a speaker on the cognitive device 52.

Figure 10:
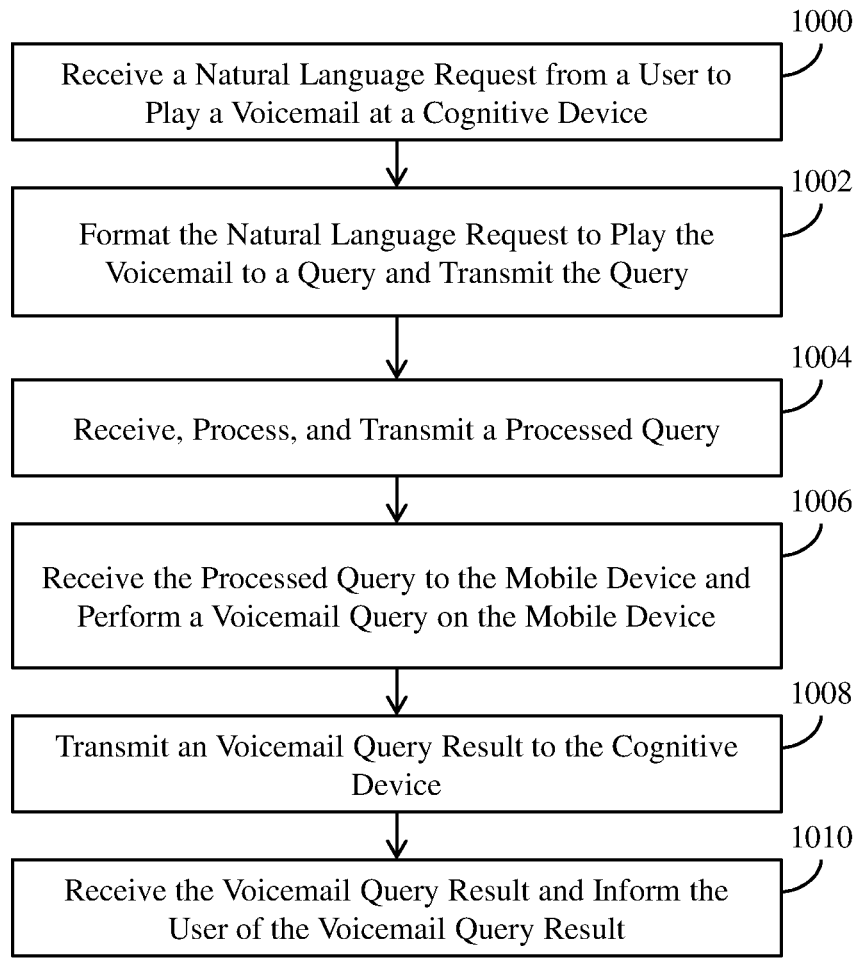
FIG. 10 illustrates a flowchart of steps of a method in accordance with aspects of the invention.

FIG. 10 shows a flowchart of steps of a method in accordance with aspects of the invention. The steps of the method describe a request by the user 53 for having the cognitive device 52 retrieve a voicemail from the mobile device 110 to the user 53. The steps of the method may be implemented in the environment of FIG. 4 and are described with reference to the elements and functions described in FIG. 4. The flowchart of FIG. 10 illustrates the architecture, functionality, and operation of possible implementations of systems, methods, and computer program products according to various embodiments of the present invention.

At step 1000, the cognitive device 52 receives a natural language request (e.g., a natural language command) from the user 53 to play a voicemail (e.g., a voicemail of a family member) from the mobile device 110. For example, the cognitive device 52 receives a natural language request to play the most current voicemail on the mobile device 110.

At step 1002, based on receiving the natural language request to play the voicemail at step 1000, the cognitive device 52 formats the natural language request to play the voicemail as a query (e.g., a JSON query) and transmits the query to the cognitive device program server 97 via the network 55. For example, based on receiving the natural language request to play the most current voicemail, the cognitive device 52 formats the natural language request to a query and transmits the query to the cognitive device program server 97.

At step 1004, the cognitive device program 99 in the cognitive device program server 97 receives and processes the query from step 102. The processing of the query includes: determining an action in the query and formatting the query to a format executable by the consumer application In aspects, the cognitive device program server 97 additionally transmits a voicemail processed query to the consumer application 112 via the notification server 54 for querying the mobile device 110 to play the voicemail.

At step 1006, the consumer application 112 receives the voicemail processed query at step 1004, determines whether the user 53 may access (e.g., level of access) the mobile device 110, and performs the voicemail query on the voice mail service 128 on the mobile device 110. For example, based on the consumer application 112 receiving the processed query, the consumer application 112 performs the voicemail query by accessing a voicemail database of the mobile device 110 and retrieves the most current voicemail on the mobile device 110.

At step 1008, based on the consumer application 112 performing the voicemail query on the mobile device 110 from step 1006, the consumer application 112 transmits a voicemail query result to the cognitive device 52 via the cognitive device program server 97. For example, based on retrieving the most current voicemail on the mobile device 110, the consumer application 112 transmits the voicemail query result, as a streaming service, to the cognitive device 52 via the cognitive device program server 97.

At step 1010, the cognitive device 52 receives voicemail query result from step 1008 and informs the user 53 of voicemail query result in natural language. For example, based on receiving the voicemail query result, the cognitive device 52 reads the voicemail to the user 53 in natural language (e.g., streaming the voicemail to the user 53 in natural language) over a speaker on the cognitive device 52.

In embodiments, a service provider could offer to perform the processes described herein. In this case, the service provider can create, maintain, deploy, support, etc., the computer infrastructure that performs the process steps of the invention for one or more customers. These customers may be, for example, any business that requires device access.

In still another embodiment, the invention provides a computer-implemented method. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computer device, a query from a cognitive device;
determining, by the computer device, whether a user of a mobile device has a required access level for the query, the required access level being based on the user being listed in settings of the mobile device;
restricting, by the computer device and based on a result of the determining being that the user is not listed in the settings of the mobile device, access to the mobile device by the cognitive device;
processing, by the computer device and based on the result of the determining being that the user is listed in the settings of the mobile device, the query to generate a processed query;
transmitting, by the computer device and based on the result of the determining being that the user is listed in the settings of the mobile device, the processed query to the mobile device;
receiving, by the computer device and based on the result of the determining being that the user is listed in the settings of the mobile device, an action query result from the mobile device based on the mobile device receiving the processed query and performing an action query; and
transmitting, by the computer device and based on the result of the determining being that the user is listed in the settings of the mobile device, the action query result to the cognitive device based on receiving the action query result.

2. The method of claim 1, wherein the processing includes determining an action in the query.

3. The method of claim 2, wherein the query includes one of: send or read a SMS message, send or read an email, activate a navigation system, retrieve a phone notification, and play a voicemail.

4. The method of claim 1, wherein the processing includes formatting the query to a format executable by the mobile device.

5. The method of claim 1, wherein the action query result includes one of: a read text query result, send text query result, a notification query result, a navigation command query result, and a voicemail query result.

6. The method of claim 1, further comprising confirming an action on the query with the cognitive device.

7. A computer program product comprising a computer readable storage medium having program instructions embodied therewith, the program instructions executable by a computer device to cause the computer device to:
receive a read Short Messaging Service (SMS) message query from a cognitive device;
determine whether a user of a mobile device has a required access level for the SMS message query, the required access level being based on the user being listed in settings of the mobile device;
restrict, based on a result of the determining being that the user is not listed in the settings of the mobile device, access to the mobile device by the cognitive device;
process, based on the result of the determining being that the user is listed in the settings of the mobile device, the read Short Messaging Service (SMS) message query to generate a read SMS message processed query;
transmit, based on the result of the determining being that the user is listed in the settings of the mobile device, the read SMS message processed query to the mobile device;

receive, based on the result of the determining being that the user is listed in the settings of the mobile device, an SMS message query result from the mobile device based on the mobile device receiving the read SMS message processed query and performing a read SMS message query;

transmit, based on the result of the determining being that the user is listed in the settings of the mobile device, the SMS message query result to the cognitive device based on receiving the SMS message query result.

8. The computer program product of claim 7, wherein a notification server transmits the processed query to the mobile device.

9. The computer program product of claim 7, wherein the query is a JavaScript Object Notation (JSON) query.

10. The computer program product of claim 7, wherein the determining comprises receiving an additional information request from the mobile device.

11. The computer program product of claim 10, wherein the additional information request includes a request for a date of the read SMS message query.

12. The computer program product of claim 10, wherein the additional information request includes a request for a particular contact in the read SMS message query.

13. The computer program product of claim 12, further comprising attempting to retrieve additional information from one of a database or the cognitive device.

14. The computer program product of claim 13, further comprising transmitting an exit command to the mobile device and the cognitive device in response to being unable to retrieve the additional information.

15. The computer program product of claim 13, further comprising transmitting the additional information to the mobile device in response to receiving the additional information from one of the database or the cognitive device.

16. A system comprising:
a CPU, a computer readable memory and a computer readable storage medium associated with a computing device;
program instructions to receive a send email query from a cognitive device;
program instructions to determine whether a user of a mobile device has a required access level for the send email query, the required access level being based on the user being listed in settings of the mobile device;
program instructions to restrict, based on a result of the determining being that the user is not listed in the settings of the mobile device, access to the mobile device by the cognitive device;
program instructions to process, based on the result of the determining being that the user is listed in the settings of the mobile device, the send email query to generate a send email processed query;
program instructions to transmit, based on the result of the determining being that the user is listed in the settings of the mobile device, the send email processed query to the mobile device,
program instructions to receive, based on the result of the determining being that the user is listed in the settings of the mobile device, a send email query result from the mobile device based on the mobile device receiving the send email processed query and performing a send email query,
program instructions to transmit, based on the result of the determining being that the user is listed in the settings of the mobile device, the send email query result to the cognitive device based on receiving the send email query result,
wherein the program instructions are stored on the computer readable storage medium for execution by the CPU via the computer readable memory.

17. The system of claim 16, wherein the send email processed query is a processed JSON query.

18. The system of claim 16, wherein send email processed query is in a format executable by the computing device.

19. The system of claim 16, further comprising confirming the send email processed query with the cognitive device.

20. The system of claim 19, further comprising storing the send email processed query as a proposed query in a session state until confirmation of the send email processed query.

* * * * *